(12) United States Patent
Zhao et al.

(10) Patent No.: US 11,655,110 B2
(45) Date of Patent: May 23, 2023

(54) UNIT LOAD DEVICE AND METHOD FOR STORING AND TRANSPORTING ARTICLES

(71) Applicant: Carrier Corporation, Palm Beach Gardens, FL (US)

(72) Inventors: Dan Zhao, Shanghai (CN); Zidu Ma, Ellington, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 260 days.

(21) Appl. No.: 17/032,666

(22) Filed: Sep. 25, 2020

(65) Prior Publication Data

US 2021/0094772 A1    Apr. 1, 2021

(30) Foreign Application Priority Data

Sep. 27, 2019   (CN) .......................... 201910923121.6

(51) Int. Cl.
*B65G 67/20*   (2006.01)
*B65D 88/74*   (2006.01)
*B65D 81/38*   (2006.01)
*F25D 11/00*   (2006.01)

(52) U.S. Cl.
CPC ......... *B65G 67/20* (2013.01); *B65D 81/3823* (2013.01); *B65D 88/74* (2013.01); *F25D 11/006* (2013.01)

(58) Field of Classification Search
CPC .... B65G 67/20; B65D 81/3823; B65D 88/74; F25D 11/006
See application file for complete search history.

(56) References Cited

U.S. PATENT DOCUMENTS

| | | | |
|---|---|---|---|
| 6,266,972 B1* | 7/2001 | Bostic | B65D 81/3823 62/530 |
| 2016/0243000 A1* | 8/2016 | Gray | F25D 3/08 |
| 2016/0313046 A1* | 10/2016 | Roekens | F25D 25/02 |
| 2017/0320054 A1* | 11/2017 | Crum | B01L 9/06 |
| 2018/0252466 A1* | 9/2018 | Baker | B01L 7/52 |
| 2018/0339833 A1* | 11/2018 | Huang | B65D 85/72 |
| 2021/0310709 A1* | 10/2021 | Ries | F25D 29/003 |
| 2021/0331834 A1* | 10/2021 | Longley | F28D 20/02 |
| 2022/0144530 A1* | 5/2022 | Vu | H04Q 9/02 |

* cited by examiner

*Primary Examiner* — Shawn M Braden
(74) *Attorney, Agent, or Firm* — Cantor Colburn LLP

(57) ABSTRACT

The present disclosure relates to a unit load device and a method for storing and transporting articles. The unit load device includes: a housing defining an internal space and an opening to the internal space; and a cover configured to operably open or hermetically close the opening; wherein the housing is provided with a housing temperature control layer containing at least a first phase change material, and/or the cover is provided with a cover temperature control layer containing at least a second phase change material, so that during storage of articles in the internal space hermetically closed by the cover, a temperature of the internal space is within a preset temperature range after a preset period of time has elapsed.

11 Claims, 3 Drawing Sheets

UNIT LOAD DEVICE AND METHOD FOR STORING AND TRANSPORTING ARTICLES

FOREIGN PRIORITY

This application claims priority to Chinese Patent Application No. 201910923121.6, filed Sep. 27, 2019, and all the benefits accruing therefrom under 35 U.S.C. § 119, the contents of which in its entirety are herein incorporated by reference.

TECHNICAL FIELD OF INVENTION

The present disclosure relates to the technical field of article transportation and preservation, and in particular, to a unit load device and a method for storing and transporting articles using the unit load device.

BACKGROUND OF THE INVENTION

Various types of unit load devices (abbreviated as ULD, which may also be called air containers, unitized transport devices, air cargo containers, etc.) have been widely used to store and transport many articles such as air cargo, especially some temperature-sensitive articles (such as medical products, food, biological vaccines, bacterial strains, etc.) that have high requirements on the temperature during storage and transportation. Usually, the unit load device will be equipped with refrigeration devices including compressors, condensers, expansion valves, evaporators and other components to control a storage environment temperature inside the unit load device. The temperature control time is long and the control effect is good, but the space occupied is relatively large, and an overall weight of the unit load device is increased, which increases the cost of use. In addition, although some other technical means are also provided in the related art to improve the unit load device, they still have some drawbacks and deficiencies in terms of structure, configuration, temperature control effect, work efficiency, manufacturing and use costs, etc.

SUMMARY OF THE INVENTION

In view of the above, the present disclosure provides a unit load device and a method for storing and transporting articles, thereby solving or at least alleviating one or more of the problems described above as well as problems of other aspects existing in the prior art.

Firstly, according to a first aspect of the present disclosure, a unit load device is provided, which includes: a housing defining an internal space and an opening to the internal space; and a cover configured to operably open or hermetically close the opening, wherein the housing is provided with a housing temperature control layer containing at least a first phase change material, and/or the cover is provided with a cover temperature control layer containing at least a second phase change material, so that during storage of articles in the internal space hermetically closed by the cover, a temperature of the internal space is within a preset temperature range after a preset period of time has elapsed.

In the unit load device according to the present disclosure, optionally, the housing temperature control layer is detachably installed on at least a part of an inner wall and/or at least a part of an outer wall of the housing, and/or the cover temperature control layer is detachably installed on at least a part of an inner wall and/or at least a part of an outer wall of the cover.

In the unit load device according to the present disclosure, optionally, the housing temperature control layer further contains a first rigid reinforcement material mixed with the first phase change material, and/or the cover temperature control layer further contains a second rigid reinforcement material mixed with the second phase change material, and the first rigid reinforcement material or the second rigid reinforcement material includes a porous foamed metal.

In the unit load device according to the present disclosure, optionally, the housing temperature control layer and the cover temperature control layer are provided to have different temperature control performances, and/or the housing temperature control layers located in at least two different areas on the housing are provided to have different temperature control performances, and/or the cover temperature control layers located in at least two different areas on the cover are provided to have different temperature control performances.

In the unit load device according to the present disclosure, optionally, the first phase change material and the second phase change material are different, and/or the first phase change materials contained in the housing temperature control layers located in at least two different areas on the housing are different, and/or the second phase change materials contained in the cover temperature control layers located in at least two different areas on the cover are different; and/or the housing temperature control layer and the cover temperature control layer have different thicknesses, and/or the housing temperature control layers located in at least two different areas on the housing have different thicknesses, and/or the cover temperature control layers located in at least two different areas on the cover have different thicknesses.

In the unit load device according to the present disclosure, optionally, a thermal insulation layer is further provided on the housing and/or the cover.

In the unit load device according to the present disclosure, optionally, the unit load device further includes a refrigeration unit configured to provide refrigeration to the internal space.

In the unit load device according to the present disclosure, optionally, the unit load device further includes: a temperature sensor configured to detect the temperature of the internal space; and a controller, which is connected to the temperature sensor and the refrigeration unit, and is configured to turn on or off the refrigeration unit when a detected current temperature of the internal space reaches a threshold thereof, so that the temperature of the internal space is within the preset temperature range.

Secondly, according to a second aspect of the present disclosure, a method for storing and transporting articles is also provided, which includes the steps of: providing one or more unit load devices as described above; storing articles to be transported in the internal space hermetically closed by the cover of the unit load device; and transporting the unit load device to a destination by using transportation means.

In the method for storing and transporting articles according to the present disclosure, optionally, the method for storing and transporting articles further includes a step of replacing at least one of the housing temperature control layer and the cover temperature control layer on the unit load device during the transportation or after arriving at the destination.

In the method for storing and transporting articles according to the present disclosure, optionally, the method for storing and transporting articles further includes a step of restoring energy of the housing temperature control layer and/or the cover temperature control layer that have been replaced, for reuse.

In the method for storing and transporting articles according to the present disclosure, optionally, the transportation means include aviation aircraft, water vehicles, rail trains, and road vehicles, and the articles are temperature-sensitive articles including medical products, biological agents, organs and food.

The principles, features, characteristics, advantages and the like of the various technical solutions according to the present disclosure will be clearly understood from the following detailed description in combination with the accompanying drawings. For example, as compared with the related art, the technical solutions of the present disclosure not only have a lighter weight of device and larger storage space for articles, but also have a long working time and a good temperature control effect. In addition, the present disclosure can be configured with a temperature control layer using a phase change material and a refrigeration unit at the same time, thereby effectively enhancing the redundancy and reliability of the system; moreover, the temperature control layer can be used repeatedly by replacement, which will help reduce the cost of use. Furthermore, the present disclosure allows a charging operation of a working battery of the unit load device and energy-restoration of the temperature control layer to be performed simultaneously, thereby significantly improving the efficiency and increasing the utilization rate of the unit load device. Therefore, the present disclosure has very outstanding practicality.

BRIEF DESCRIPTION OF THE DRAWINGS

The technical solutions of the present disclosure will be further described in detail below with reference to the accompanying drawings and embodiments. However, it should be understood that these drawings are designed merely for the purpose of explanation and only intended to conceptually illustrate the structural configurations described herein, and are not required to be drawn to scale.

DETAILED DESCRIPTION OF THE INVENTION

First, it should be noted that the components, working principles, steps, characteristics, advantages and the like of the unit load device and the method for storing and transporting articles according to the present disclosure will be described below by way of example. However, it should be understood that all the descriptions are merely givens for illustration, and should be understood as limiting the present disclosure in any way. Herein, the technical terms "first" and "second" are merely used for distinguishing purpose, and are not intended to indicate their order and relative importance. The technical term "connect (or connected, etc.)" covers a situation where a specific component is directly connected to another component and/or indirectly connected to another component, and the technical terms "upper", "lower", "top", "bottom", "front", "rear", "inner", "outer" and their derivatives should be related to the orientations in individual drawings. The present disclosure can take various alternative orientations, unless otherwise indicated.

In addition, for any single technical feature described or implied in the embodiments mentioned herein, or any single technical feature depicted or implied in the accompanying drawings, the present disclosure still allows for any combination or deletion of these technical features (or equivalents thereof) without any technical obstacles, so that more other embodiments of the present disclosure that may not have been mentioned directly herein can be obtained.

Figure 1:
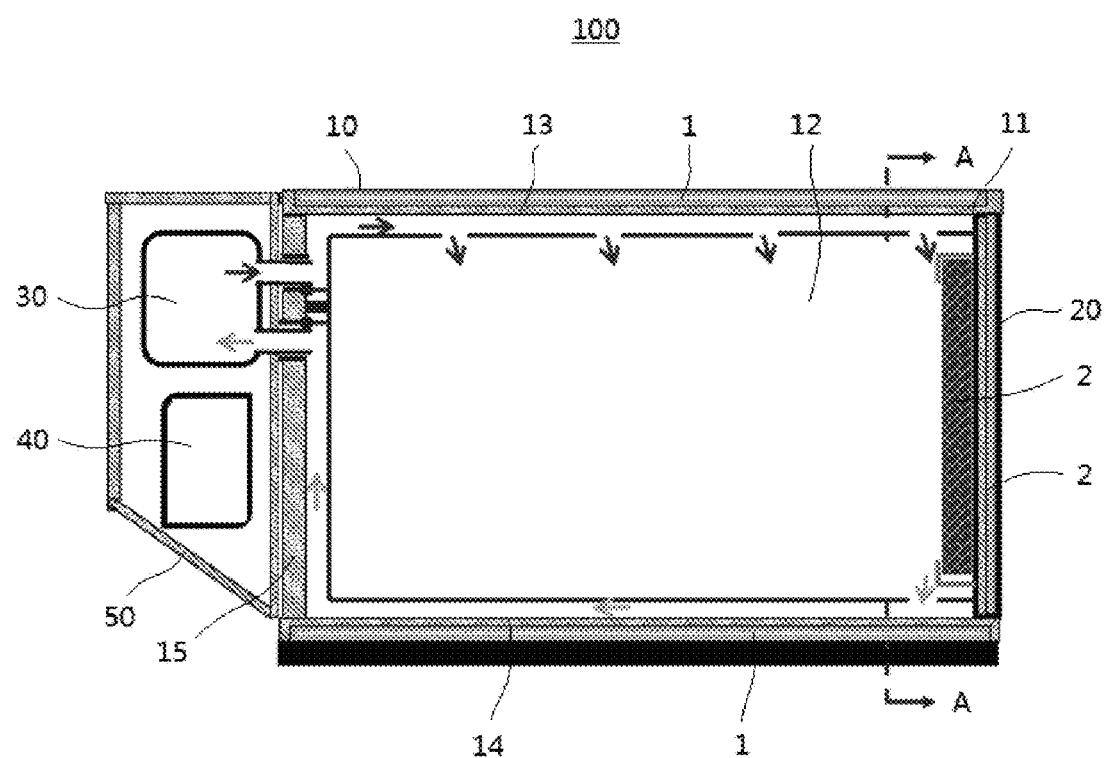
FIG. 1 is a schematic side sectional view of an embodiment of a unit load device according to the present disclosure.
Figure 2:
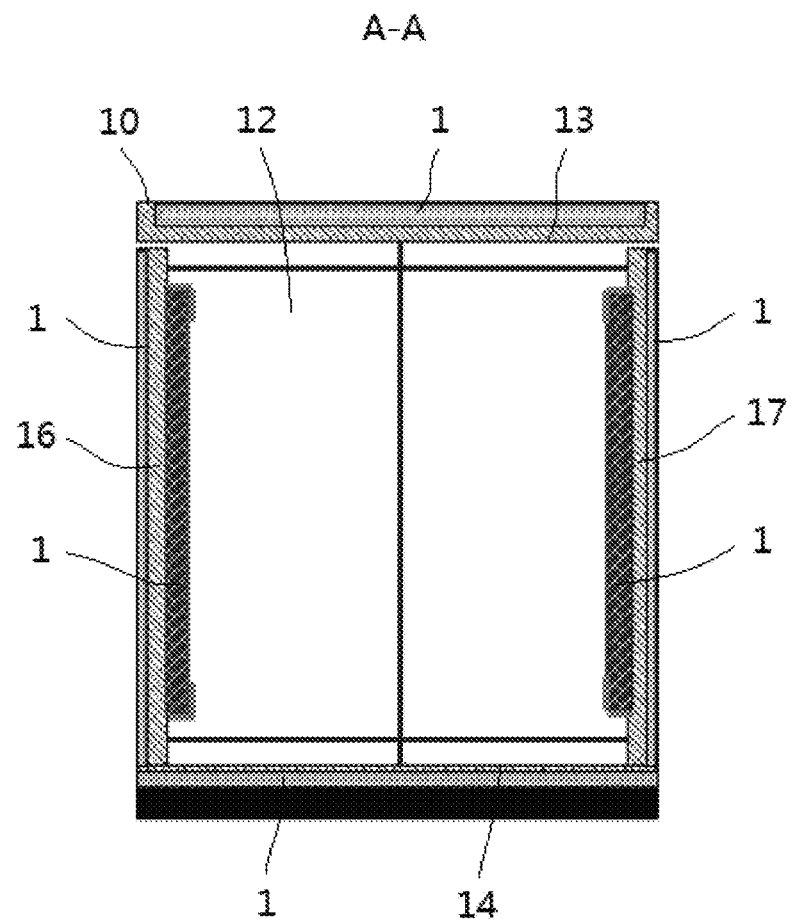
FIG. 2 is a schematic cross-sectional view taken along direction A-A in FIG. 1.

FIG. 1 and FIG. 2 only schematically show a general structure of an embodiment of a unit load device according to the present disclosure. The technical solutions of the present disclosure will be described in detail below through this embodiment.

Referring to the above two figures in combination, in this embodiment, a unit load device 100 includes a housing 10 and a cover 20. As for the housing 10, it may be made in any way available so as to provide an internal space 12 that can be used to store articles. For example, a structural frame forming the housing 10 may be configured by a plurality of plates. As shown in FIGS. 1 and 2, in the example given, a top plate 13, a bottom plate 14, a left side plate 16, a right side plate 17 and a rear plate 15 are used to construct the housing 10 of the unit load device 100. Any feasible connection method (such as snap-fit, screwing, welding, bonding or any combination thereof) can be used to assemble and connect these plates together. Of course, all or some of the plates may also be integrally formed by injection molding process or the like, which may be selected as actually required.

The cover 20 is used to cooperate with an opening 11 provided on the housing 10, so that the opening 11 can be opened or closed by operating the cover 20, thus enabling articles to be placed into the internal space 12 of the unit load device 100 or taken out of the internal space 12 through the opening 11 very conveniently. Generally speaking, a structural form such as a plate may be adopted for the cover 20, and the cover 20 can be assembled with the housing 10 by using numerous installation and connection forms such as a hinge form and a sliding form. As for the cover 20 itself, it can be configured into any suitable structure, such as a single-door, a double-door, and a multiple-door. In order to achieve a better temperature control effect, sealing components such as sealing strips are usually provided on the cover 20 and/or the opening 11 to achieve a good sealing effect and avoid an adverse temperature effect on the internal storage environment of the unit load device 100 caused by heat exchange between the internal storage environment and the external environment.

According to the innovative design concept of the present disclosure, a temperature control layer using a phase change material (PCM) may be provided on at least a part of the above-mentioned housing 10 and/or the cover 20, so that the internal temperature environment of the unit load device 100 can be maintained for a longer time, efficiently and at a low cost, which will be very advantageous for long-term preservation of the articles placed therein under controlled temperature conditions.

Specifically, as shown in FIG. 1 and FIG. 2, it is not only possible to provide corresponding housing temperature control layers 1 on an inner wall and/or an outer wall of any one or more of the top plate 13, the bottom plate 14, the left side plate 16, the right side plate 17 and the rear plate 15 of the housing 10 for example, but also corresponding cover temperature control layers 2 may be provided on an inner wall and/or an outer wall of the cover 20, or the above settings may be applied to both the housing 10 and the cover 20 simultaneously so as to further enhance the temperature control effect.

As for the above-mentioned temperature control layer, it may use any feasible phase change material such as solid-solid phase change material, and solid-liquid phase change material, or any combination thereof. This kind of phase change material has the characteristics of changing the physical state and releasing latent heat with temperature change. The process of physical state change is a phase change process, and a large amount of heat is released or absorbed during this process. Such characteristics of the phase change material will be applied by the present disclosure to adjust and control the internal temperature environment of the unit load device 100. Since many types of phase change materials (for example, paraffin, stearic acid and other organic substances, inorganic substances, water-containing salts, etc.) have already been discovered and provided the related art, and such phase change materials have been understood and mastered by those skilled in the art, no repeated description will be given herein.

It should be noted that in some applications, rigid reinforcement materials may be provided in the above-mentioned housing temperature control layer 1 and/or cover temperature control layer 2 at the same time to enhance the rigidity of such temperature control layers, so that the unit load device 100 can better resist impacts, vibrations, collisions or the like that may occur during use, and the unit load device 100 can be more durable.

In practical applications, for the above-mentioned rigid reinforcement material, a porous foamed metal such as foamed copper, foamed aluminum, foamed nickel, foamed steel and foamed aluminum alloy, or any other suitable material may be selected. The phase change materials may be mixed and used with such rigid reinforcement material, which can also promote a more uniform distribution of the phase change material, which is advantageous for exhibiting a temperature control effect that tends to be more uniform for the same temperature control layer. However, it should be pointed out that according to different application requirements, the temperature control layers disposed in different areas of the unit load device 100 can use exactly the same rigid reinforcement material, or it is also possible to use rigid reinforcement materials that are not exactly the same. For example, since the cover 20 in the unit load device 100 is frequently operated and used, and the bottom plate 14 is in a load-bearing state for a long time, it may be considered to use the rigid reinforcement material with higher rigidity for them, or alternatively or additionally, it may also be considered to increase the corresponding usage of rigid reinforcement materials.

By selecting and providing corresponding temperature control layers on the unit load device 100, for example, by providing the housing temperature control layer 1 on the housing 10 and/or providing the cover temperature control layer 2 on the cover 20 according to application needs, it is possible that during the storage of articles in the sealed and closed internal space 12, the internal environment temperature can still be maintained within a preset temperature range after a preset period of time has elapsed. The above-mentioned preset period of time, preset temperature and other parameters are considered and set according to specific application conditions such as article characteristics, preservation requirements, and temperature conditions of transportation means. According to the solution of the present disclosure, by selecting and providing the corresponding temperature control layers in this way, the desired storage and preservation requirements for articles can be achieved, and its temperature control effect is significantly better than the related art. This is very advantageous for the storage and transportation of temperature-sensitive articles such as various medical products, biological agents, organs (such as human body, animals, etc.), food, etc. Therefore, the present disclosure has high application value.

Figure 3:
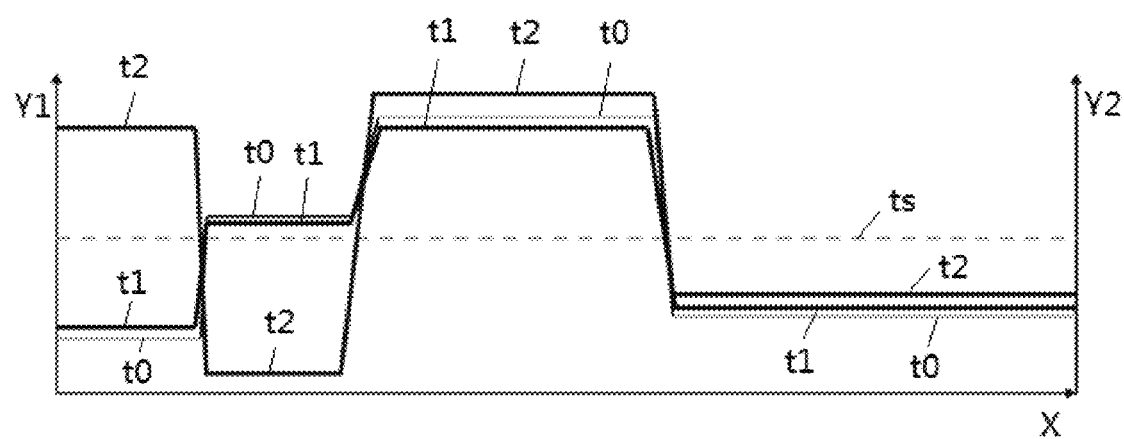
FIG. 3 is a schematic view of a temperature control effect curve of an existing unit load device product.
Figure 4:
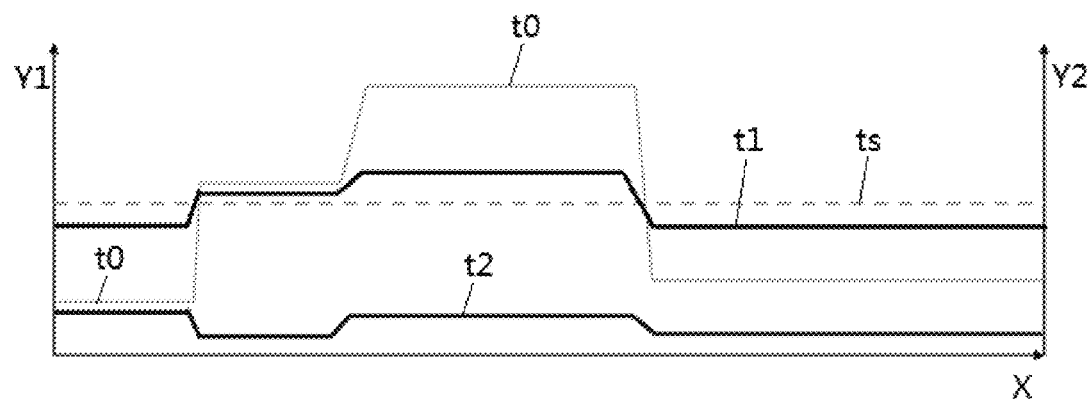
FIG. 4 is a schematic view of a temperature control effect curve when the embodiment of the unit load device shown in FIG. 1 is used.

For example, FIG. 3 shows a situation where an existing unit load device product is used for temperature control effect, and FIG. 4 shows a situation where the unit load device 100 described in the present disclosure is used for temperature control effect under the same conditions. In FIGS. 3 and 4, curves ts, t0, t1, and t2 represent a preset control temperature (that is, an intermediate value of the preset temperature range in this context), a temperature of the environment where the unit load device is located, an outer surface temperature of the unit load device, and a thermal load of the unit load device respectively, wherein the abscissa X, the ordinate Y1 and the ordinate Y2 correspondingly represent the period of time, temperature and thermal load respectively. By comparing the above curve changes in FIG. 3 and FIG. 4, it can be clearly found that under the same external environment temperature conditions and temperature control targets, the thermal load and outer surface temperature of the existing unit load device product have significant large fluctuations, which will cause considerable adverse effects on the preservation of articles; in contrast, the thermal load and outer surface temperature of the unit load device 100 have very small changes and fluctuations. Not only the performance is quite stable, but also the absolute values of the thermal load and the outer surface temperature can both be effectively controlled to be within the preset target, which can effectively guarantee and realize the high-quality preservation of articles. As compared with the existing unit load device shown in FIG. 3, the unit load device 100 shows an outstanding temperature control effect, and the technical advantages are very obvious.

In a specific implementation of the solution of the present disclosure, the above-mentioned good technical effects can be achieved in a variety of possible ways. Especially, in optional situations, by making the temperature control layers located at different positions have different temperature control performances, achievement of the above targets can be further promoted.

For example, although it may be convenient for the temperature control layers on the unit load device 100 to use the same phase change material uniformly, for the housing temperature control layer 1 and the cover temperature control layer 2, they are still allowed to use different phase change materials (including any combination of phase change materials) separately, so that a differentiated temperature control effect can be obtained at the corresponding areas of their placement positions. For example, an area on the housing 10 that is adjacent to the opening 11 and an area on the cover 20 that is adjacent to the opening 11 are both provided with a temperature control layer made of a phase change material with stronger working performance to enhance the temperature control effect, thereby promoting the unit load device 100 to achieve a better temperature control as a whole, which is therefore helpful for maintaining the articles in the hermetically closed internal space 12 within the preset temperature range after the preset period of time has elapsed.

For another example, as for the housing temperature control layers 1 provided at different areas on the housing 10, they can use the same phase change material and the above-mentioned rigid enhancement material, and different phase change materials and/or rigid reinforcement materials are also allowed to be used. It can be understood that the above situation is also applicable to the cover temperature control layers 2 provided at different areas on the cover 20.

For further another example, by targetedly selecting and using phase change materials or their combination with rigid reinforcement materials, the housing temperature control layers 1 provided on the housing 10 can have exactly the same thickness, or thicknesses that are not exactly the same. In this way, the corresponding area can be promoted to obtain the desired temperature control treatment purposely, thereby promoting the unit load device 100 to achieve a better temperature effect as a whole. Similarly, the above situation is also applicable to the cover temperature control layers 2 provided at different areas on the cover 20. In this way, the temperature control layers located at various places on the unit load device 100 can exhibit the desired temperature control performances that may not be exactly the same very flexibly and targetedly, which has very obvious positive significance on making full use of various material properties, avoiding material waste, improving the working performance of the unit load device and reduce the cost of use, etc.

In addition, as for the housing temperature control layers 1 and the cover temperature control layers 2 located at various places, the present disclosure allows for various possible ways to dispose them respectively on the housing 10 and/or the cover 20. For example, one, several or all of the temperature control layers can be fixed to the corresponding positions on the unit load device 100 by welding, linking or the like. However, in some embodiments, the present disclosure allows one, several or all of the temperature control layers (i.e., the housing temperature control layer 1 and the cover temperature control layer 2) to be detachably installed to the housing 10 or the cover 20. For example, screws, bolts, snap-fit slots and the like or a combination thereof can be used for implementation. In this way, it is very convenient to perform operations such as replacement and maintenance of the temperature control layers. For example, in case of such situations where one or some certain temperature control layers undergo a phase change working process and lose their temperature control ability, or their temperature control ability is weakened due to some reasons, the above-mentioned temperature control layers can be detached from the unit load device 100 very conveniently, and then immediately energy-restored (for example, placed in a low temperature environment for a period of time, etc.) before being installed again onto the unit load device 100 and put into use; alternatively, other temperature control layers can be directly used for replacement. The adoption of the above measures not only makes the operation very convenient and fast, but also can greatly reduce the use cost of the unit load device 100.

It should also be noted that although the above-discussed way of setting temperature control layers is used alone in the unit load device 100 for temperature control, according to some embodiments of the present disclosure, a refrigeration unit 30 may also be provided at the same time to provide refrigeration to the internal space 12 of the unit load device 100 in order to achieve a better temperature control effect, which is exemplarily shown in FIG. 1.

As shown in FIG. 1, an additional housing 50 may be added to the unit load device 100, and the housing 50 may be fixedly or detachably installed and connected to the housing 10, and then the refrigeration unit 30 is disposed in the housing 50 and forms an air flow channel with the internal space 12 of the unit load device 100. When the refrigeration unit 30 is turned on to work, it can form an air flow in the direction shown by the arrows in FIG. 1, so as to bring a cooling effect to the internal space 12, which will provide another way to realize the temperature control of the internal environment of the unit load device 100 and increase the working reliability of the entire device. Especially, when the temperature control ability of the temperature control layer using phase change material is weakened or lost, the refrigeration unit 30 can be put into use in time, which is very advantageous for realizing the goal of maintaining the articles within the preset temperature range after the preset period of time has elapsed.

In an optional situation, a temperature sensor and a controller may be optionally provided to control the operation of the refrigeration unit 30. Specifically, the temperature sensor may be disposed, for example, at any suitable position on the unit load device 100 to detect the temperature of the internal space 12 (i.e., the temperature of the environment where the articles are stored). Once it is found that the current temperature detected by the temperature sensor reaches the threshold (the specific value of which may be set and adjusted according to the specific application requirements), then the operating conditions of the refrigeration unit 30 can be controlled accordingly to make the temperature in the internal space 10 be within a preset temperature range. For example, if it is found that the current temperature is already higher than a set first threshold, which may not be advantageous for the current preservation of the articles, the refrigeration unit 30 is turned on to provide refrigeration to the internal space 12. For another example, if it is found that the current temperature is already lower than a set second threshold (which is less than the aforementioned first threshold), which may also not be advantageous for the current preservation of the articles, the refrigeration unit 30 can be turned off. The above-mentioned controller can be implemented by hardware such as chips and circuit modules, or by software, or by a combination of software and hardware.

As for the refrigeration unit 30, many types of implementations thereof have been provided in the related art, which are well known to those skilled in the art. For example, the refrigeration unit 30 can usually include compressors, condensers, expansion valves, evaporators and other components. Therefore, no detailed description will be given herein. In addition, although the refrigeration unit 30 can be provided with electric power on transportation means such as ships, trains and trucks, in an optional situation, the refrigeration unit 30 can be equipped with a battery 40 as shown in FIG. 1 so that the refrigeration unit 30 can be used in more occasions to expand the application range of the unit load device. It should be noted that the battery 40 can be installed on the unit load device 100 in a fixed or detachable manner; for example, it can be installed in the aforementioned housing 50 or at other suitable positions.

As mentioned above, when the above two temperature control methods are used in combination, since the refrigeration unit 30 can be used only as a part of the implementation of the overall temperature control function, it is allowed to use a battery with a smaller capacity (for example, a reduction of 50% or more), and it is possible to use a more compact refrigeration unit, which will release a larger storage space for articles; that is, the internal space of the unit load device according to the present disclosure can be larger than the cargo space of existing unit load device products, which is therefore helpful for further lowering the cost of use and resulting in a wider application range.

In addition, an obvious technical advantage of the unit load device of the present disclosure is that, since components such as the above-mentioned refrigeration unit, battery, housing 50 are not necessary, they can be flexibly selected and configured as required. For example, one or more of them are detachably assembled with a main body of the unit load device, or separated. In contrast, the existing unit load device products are manufactured by using the refrigeration unit (which may include a battery) as a necessary component of the unit load device. They must be used at the same time and cannot be separated, otherwise the unit load device will lose the function of storing articles. Before the present disclosure was proposed, the above-mentioned fixed way of thinking had been commonplace in the industry for a long time, and therefore has not been overcome for a long time. Since the present disclosure has the above advantage of flexible configuration, it is possible to avoid using detachable parts such as refrigeration unit, battery, housing 50 and the like at the same time in many applications. When transporting articles of the same weight, the total transport weight can be reduced and the expenses can be reduced, which can save considerable costs such as for air transportation involving high transport expenses. It should be understood that without departing from the spirit of the present disclosure, the present disclosure allows for various possible flexible designs, changes and adjustments according to actual application conditions. For example, in some embodiments, it is also allowed to provide a thermal insulation layer at any suitable position on the housing 10 and/or the cover 20 to further enhance the overall temperature control effect of the unit load device. Therefore, the thermal insulation layer can be made of various suitable materials separately such as glass wool, thermal insulation felt, foam plastic, etc., and then it is installed on the housing 10 or the cover 20 (for example, it can be provided on the inner side or outer side of the temperature control layer). Alternatively, for example, the housing 10 and the cover 20 themselves can also be made of materials with thermal insulation property, so as to simultaneously serve as the above thermal insulation layer. For another example, although in FIGS. 1 and 2, the unit load device 100 is exemplified as a substantially rectangular configuration, in practical applications, it is allowed to be configured into any possible shape such as a cylindrical shape, a square shape, and a circular shape.

Figure 5:
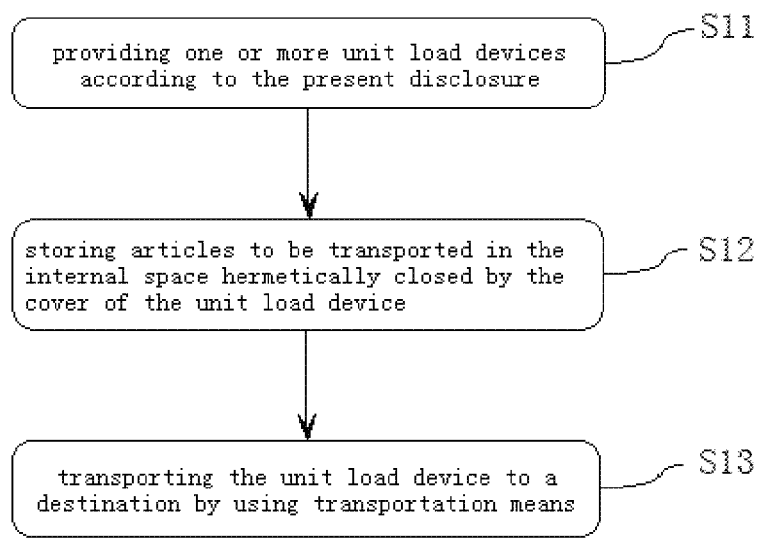
FIG. 5 is a schematic flowchart of an embodiment of a method for storing and transporting articles according to the present disclosure.

In addition, according to another technical solution of the present disclosure, a method for storing and transporting articles is also provided, which is particularly suitable for temperature-sensitive articles such as medical products, biological agents, organs, and food. As an example, as shown in FIG. 5, the method for storing and transporting articles may include the following steps:

In step S11, one or more unit load devices designed according to the present disclosure may be provided. Regarding this type of unit load device, one of the embodiments has been exemplarily introduced in the foregoing in conjunction with FIGS. 1 to 4, so reference may be directly made to the specific description of the corresponding part above, and no repeated description will be given herein.

Next, in step S12, articles to be transported can be stored in the internal space that has been hermetically closed by the cover in the unit load device. Since the unit load device according to the present disclosure has the aforementioned technical advantages obviously superior to existing unit load device products, it can achieve a good temperature control effect on the articles stored therein. Although in many occasions, the above articles may be temperature-sensitive articles, the types of articles actually stored and transported are completely allowed to be various.

Then, in step S13, the unit load device 100 that has stored the above-mentioned articles can be transported to the destination by using transportation means. The above-mentioned transportation means may include, but are not limited to, for example, aviation aircraft, water vehicles, rail trains, and road vehicles. As mentioned above, due to the use of the unit load device according to the present disclosure, the above articles can still be maintained within the preset temperature range after arriving at the destination (that is, the process may correspond to the preset period of time mentioned above) so that the corresponding application requirements can be met.

As an optional situation, in the method for storing and transporting articles of the present disclosure, one or more temperature layers (i.e., the housing temperature control layer 1 and the cover temperature control layer 2) on the unit load device may also be replaced during the transporting or after arriving at the destination. This may be a countermeasure to solve the above problem that the temperature control ability of the temperature layer is lost, weakened or damaged. For example, a spare temperature layer can be used for replacement.

Further, as for the housing temperature control layer 1 and/or the cover temperature control layer 2 that have been replaced, energy-restoration can be performed. For example, on satisfying transportation means or at the destination, the housing temperature control layer 1 and/or the cover temperature control layer 2 may be placed in a low temperature environment and kept for a period of time (which will be selected and set according to the performance of the phase change material of the temperature control layer, etc.) to complete the energy-restoration, so that they can be installed on the original unit load device again or other suitable unit load devices and put into use, thereby effectively reducing the overall cost of use.

The unit load device and the method for storing and transporting articles according to the present disclosure have been elaborated above in detail by way of example only. These examples are merely used to illustrate the principles and embodiments of the present disclosure, rather than limiting the present disclosure. Various modifications and improvements can be made by those skilled in the art without departing from the spirit and scope of the present disclosure. Therefore, all equivalent technical solutions should fall within the scope of the present disclosure and be defined by the claims of the present disclosure.

What is claimed is:

1. A unit load device, comprising:
a housing defining an internal space and an opening to the internal space; and
a cover configured to operably open or hermetically close the opening,
wherein the housing is provided with a housing temperature control layer containing at least a first phase change material, and/or the cover is provided with a cover temperature control layer containing at least a second phase change material, so that during storage of articles in the internal space hermetically closed by the cover, a temperature of the internal space is within a preset temperature range after a preset period of time has elapsed;

a refrigeration unit configured to provide refrigeration to the internal space, the refrigeration unit located in an additional housing exterior to the unit load device, the refrigeration unit providing cooled air to the internal space through an air flow channel between the additional housing and the internal space.

2. The unit load device according to claim 1, wherein the housing temperature control layer is detachably installed on at least a part of an inner wall and/or at least a part of an outer wall of the housing, and/or the cover temperature control layer is detachably installed on at least a part of an inner wall and/or at least a part of an outer wall of the cover.

3. The unit load device according to claim 1, wherein the housing temperature control layer further contains a first rigid reinforcement material mixed with the first phase change material, and/or the cover temperature control layer further contains a second rigid reinforcement material mixed with the second phase change material, and the first rigid reinforcement material or the second rigid reinforcement material comprises a porous foamed metal.

4. The unit load device according to claim 1, wherein the housing temperature control layer and the cover temperature control layer are provided to have different temperature control performances, and/or the housing temperature control layers located in at least two different areas on the housing are provided to have different temperature control performances, and/or the cover temperature control layers located in at least two different areas on the cover are provided to have different temperature control performances.

5. The unit load device according to claim 4, wherein the first phase change material and the second phase change material are different, and/or the first phase change materials contained in the housing temperature control layers located in at least two different areas on the housing are different, and/or the second phase change materials contained in the cover temperature control layers located in at least two different areas on the cover are different; and/or the housing temperature control layer and the cover temperature control layer have different thicknesses, and/or the housing temperature control layers located in at least two different areas on the housing have different thicknesses, and/or the cover temperature control layers located in at least two different areas on the cover have different thicknesses.

6. The unit load device according to claim 1, wherein a thermal insulation layer is further provided on the housing and/or the cover.

7. The unit load device according to claim 1, further comprising:

a temperature sensor configured to detect the temperature of the internal space; and a controller, which is connected to the temperature sensor and the refrigeration unit, and is configured to turn on or off the refrigeration unit when a detected current temperature of the internal space reaches a threshold thereof, so that the temperature of the internal space is within the preset temperature range.

8. A method for storing and transporting articles, comprising:

providing one or more unit load devices according to claim 1;

storing articles to be transported in the internal space hermetically closed by the cover of the unit load device; and transporting the unit load device to a destination by using transportation means.

9. The method for storing and transporting articles according to claim 8, further comprising:

replacing at least one of the housing temperature control layer and the cover temperature control layer on the unit load device during the transportation or after arriving at the destination.

10. The method for storing and transporting articles according to claim 9, further comprising:

restoring energy of the housing temperature control layer and/or the cover temperature control layer that have been replaced, for reuse.

11. The method for storing and transporting articles according to claim 8, wherein the transportation means comprise aviation aircraft, water vehicles, rail trains, and road vehicles, and the articles are temperature-sensitive articles comprising medical products, biological agents, organs and food.

* * * * *